H. Marbin.
Brick Machine.

Reissued Apr. 9, 1867.

No. 2,553.

Witnesses.
Geo. Fusch
W. Covington

Inventor
H. Marbin
By Munn & Co
Att

United States Patent Office.

EGBERT C. BRADFORD, JAMES H. RENICK, AND OBADIAH A. CLOUGH, OF NEW YORK, N. Y., ASSIGNEES OF HENRY MARTIN.

*Letters Patent No.* 48,419, *dated June* 27, 1865; *reissue No.* 2,553, *dated April* 9, 1867.

IMPROVED BRICK MACHINE.

The Schedule referred to in these Letters Patent and making part of the same.

TO ALL WHOM IT MAY CONCERN:

Be it known that HENRY MARTIN, of Springfield, in the county of Hampden, and State of Massachusetts, invented a new and improved Brick Machine, and we do hereby declare that the following is a full, clear, and exact description thereof, which will enable others skilled in the art to make and use the same, reference being had to the accompanying drawing, forming part of this specification, in which—

Similar letters of reference indicate like parts.

This invention relates to certain improvements in that class of brick presses in which the clay is tempered by a series of knives secured in a revolving shaft, and afterward discharged on a grate which forms the bottom of a box in which the plunger moves. By the action of the plunger the clay is forced through the grate into the moulds which are fed to the machine through a lateral opening and brought under the grate by the action of a pusher working on a roller platform, and operated by a suitable lever arrangement.

The invention consists in a peculiar mechanism for operating the plunger and the gate which cuts off or opens the communication between the box for tempering the clay and the press-box. Said mechanism is so constructed that it occasions the least possible loss by friction, and that the motion of the plunger can be regulated according to the thickness of the bricks to be made. The press-box is provided with a slide through which stones and other impurities can be made to discharge from the press-box at any moment. The pusher which serves to bring the moulds under the grate is operated by a hand-lever secured to a rock-shaft. From this rock-shaft extend two arms which connect by suitable links with the pusher in such a manner that by imparting to the rock-shaft an oscillating motion, the pusher is moved back and forth on the roller platform and the moulds are carried in the desired position under the grate.

Figure 2:
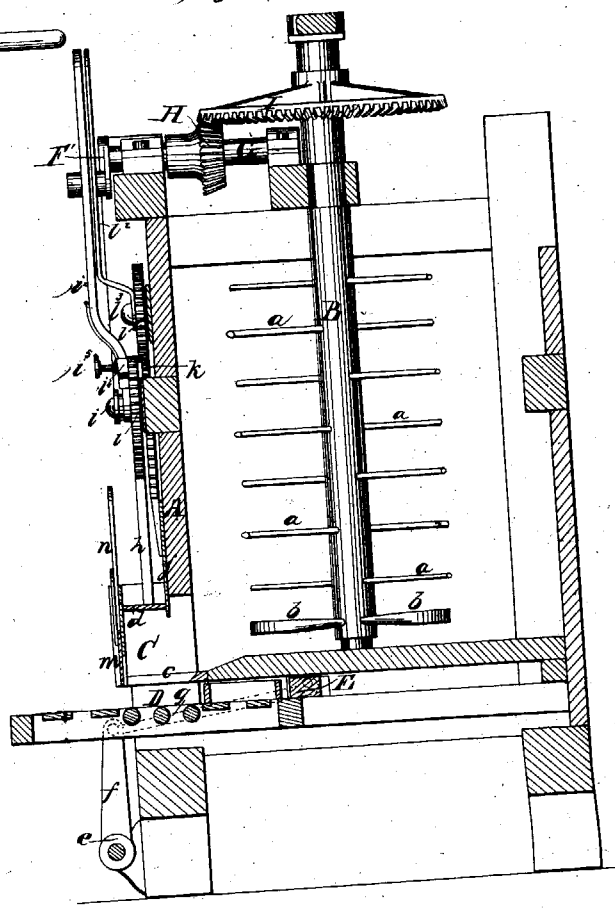
Figure 2 is a longitudinal vertical section of the same, the line *x x*, fig. 1, indicating the plane of section.
Figure 1:
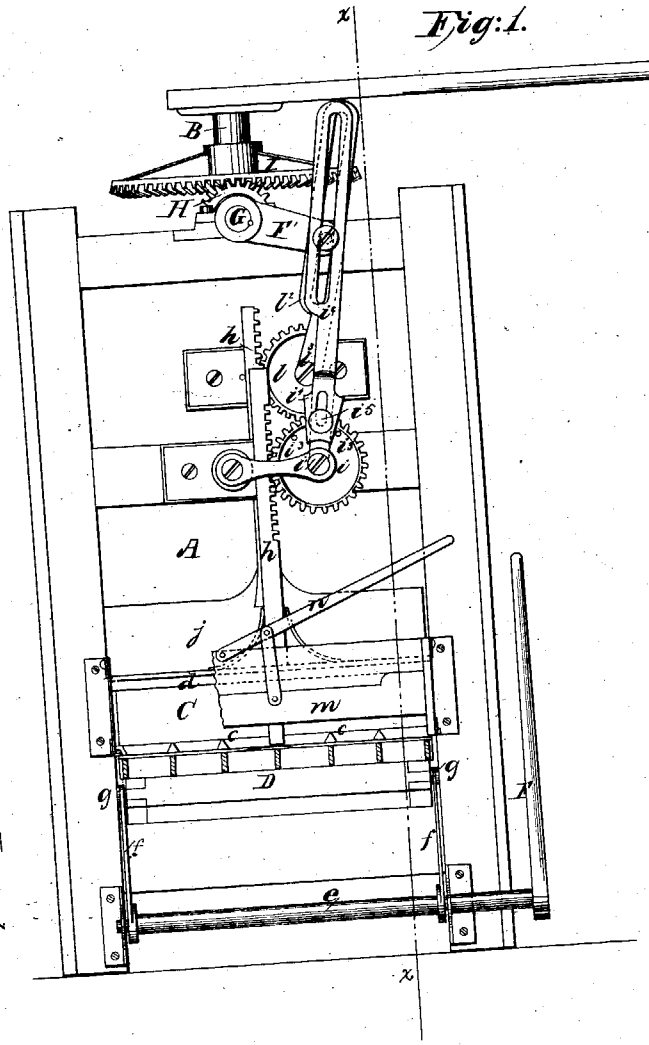
Figure 1 represents a front elevation of this invention partly in section.

A represents a box made of wood or any other suitable material, and of any suitable size and shape. Through the centre of this box extends a vertical shaft, B, to which a rotary motion is imparted by a suitable lever, and by a horse or any other desirable power. Said shaft is armed with a series of arms or knives, *a*, which serve to mix or temper the clay, and curved scoops *b* inserted in the lower end of said shaft force the tempered clay out into the press-box C. The bottom of this press-box is formed by a grate, *c*, the bars of which are at such a distance apart that they correspond to the partitions of the moulds. A plunger, *d*, which is fitted in the press-box, forces the clay through the spaces between the grate-bars into the moulds. These moulds are made of wood or any other suitable material, and they rest upon a roller platform, D, as clearly shown in fig. 2 of the drawing. A pusher, E, carries the moulds under the grate. This pusher is operated by a hand-lever, F, that is mounted to the end of a rock-shaft, *e*, and from said rock-shaft extend two arms *f*, which connect by rods *g* with the pusher. The plunger *d* is suspended from the lower end of a toothed rack, *h*, to which motion is imparted by a cog-wheel or toothed segment, *i*, and the communication between the box A and the press-box is opened and closed by a gate, *j*, which is suspended from the lower end of a toothed rack, *k*, and to which motion is imparted by a cog-wheel or toothed segment, *l*. The cog-wheel *i* is mounted on a stationary axle, $i^1$, and it turns loosely on the same, motion being imparted to it by a slotted arm or lever, $i^2$, which also turns loosely on the axle or pin $i^1$. An oscillating motion is imparted to the lever $i^2$ by a crank, $F^1$, the crank-pin of which passes through the slot in said lever, and the motion of the lever is transmitted to the wheel *i* by means of two pins $i^3$ inserted into the wheel, or on either side of the lever $i^2$. In order to regulate the motion of the cog-wheel *i*, the pins $i^3$ are placed at such a distance apart that the lever itself will not come in contact with them in either direction. But a tapering slide, $i^4$, is secured to the lever $i^2$ by means of set-screws $i^5$, and it is provided with a slot so that it can be moved up or down and adjusted in any desired position. When the slide is depressed to its lowest position it fills up the space between the pins $i^3$, and the full motion of the lever $i^2$ is transmitted to the cog-wheel *i*, and through it and the rack *h* to the plunger. When the slide $i^4$ is raised, it does not fill the space between the pins $i^3$, and the lever $i^2$ oscillates over a certain arc before it imparts motion to the cog-wheel *i*, and the stroke of the plunger decreases the higher said slide is raised. The cog-wheel *l*, which imparts motion to the gate *j*, has its bearing on a pin, $l^3$, secured inside of the mixing-box A, and it is rigidly connected to a slotted arm or lever, $l^2$, the slot of which straddles the crank-pin of the crank $F^1$, the same as the slot in the lever $i^2$. The lever $l^2$, however, is not adjustable, and the stroke of the gate remains unchanged, no matter what the size of the bricks to be produced. By observing the relative positions of the levers $i^2$ $l^2$, it will be seen that the stroke of the gate is somewhat larger than that of the plunger, and said plunger begins to rise somewhat ahead of the gate, so that no fresh clay is allowed to enter the press-box before the filled mould is removed and replaced by another. The crank $F^1$ is mounted on the end of a shaft, G, and motion is imparted to it from the central arbor B by bevel-gear H I. By the action of the crank-pin on the slotted levers $i^2$ $l^2$, the motion of the central shaft B is transmitted to the gate and plunger with the least possible loss by friction. The press-box C is provided with a gate, *m*, in front which can be opened or closed by means of a hand-lever, *n*. By means of this gate, stones or other impurities which may find their way into the press-box can be removed instantaneously and without stopping the motion of the press. The front of the press-box is hinged and can be thrown open whenever it may be desirable to obtain free access to the same.

What we claim as new, and desire to secure by Letters Patent, is—

1. The mixing-box A, and press-box C, with its grate *c c*, in combination, substantially as described, with each other and with the gate *j*, operating to close the press-box against any admission of clay while the moulds are being filled as set forth.

2. The manner of regulating the rise and fall of the plunger *h*, by means of the adjustable tapering slide or gauge $i^4$ on the slotted lever $i^2$, in combination with the pins $i^3$, on the toothed segment or wheel *i*, substantially, as set forth.

3. The manner of working the plunger *d*, in the press-box *c*, by means of the crank F with its wrist, the slotted lever $i^2$, with its adjustable tapering slide or gauge $i^4$, the toothed segment or wheel *i*, with its pins $i^3$, and the rack *h* attached to the plunger, all combined and operating substantially as and for the purpose specified.

4. The cog-wheel *l*, and slotted lever $l^2$, operated by the wrist of the crank F, in combination with the rack *k*, attached to the gate *j*, substantially as and for the purpose set forth.

5. The devices for operating the moulds under the press-box *c*, consisting of the lever P, rock-shaft *e*, arms F, connecting links *g*, and pusher E, all combined and operating substantially as and for the purpose specified.

6. The gate *m*, raised and lowered by the lever *n* or its equivalent, in combination with the press-box *c*, for the purpose described.

EGBERT C. BRADFORD,
JAMES H. RENICK,
OBADIAH A. CLOUGH.

Witnesses:
BURLEIGH L. CRANS,
CHAS. A. FOWLER.